United States Patent

Luscher

[15] 3,645,088

[45] Feb. 29, 1972

[54] ELECTRONIC TIMEPIECE

[72] Inventor: Jakob Luscher, Carouge, Switzerland

[73] Assignee: Societe Suisse pour l'Industrie Horlogere S.A., Geneva, Switzerland

[22] Filed: July 17, 1970

[21] Appl. No.: 55,695

[30] Foreign Application Priority Data

July 18, 1969 Switzerland ..........................11006/69

[52] U.S. Cl. ..........................................................58/23 A
[51] Int. Cl. ..........................................................G04c 3/00
[58] Field of Search ..................................58/23, 23 A, 25, 28

[56] References Cited

UNITED STATES PATENTS 3,560,998 2/1971 Walton ......................................58/23

*Primary Examiner*—Richard B. Wilkinson
*Assistant Examiner*—Edith C. Simmons
*Attorney*—Waters, Roditi, Schwartz & Nissen

[57] ABSTRACT

An electronic timepiece which comprises a time standard that delivers a periodic signal of predetermined frequency, an electronic divider, an electromechanical converter controlled by the divider, time display means actuated by the converter, a two-phase voltage generator controlled by the time standard and a two-phase network supplied by the generator, the various stages of the divider being associated with one or the other of the network phases.

3 Claims, 3 Drawing Figures

ELECTRONIC TIMEPIECE

DISCLOSURE

This invention relates to an electronic timepiece of the kind comprising a time standard delivering a periodic signal of predetermined frequency, an electronic divider for dividing said frequency, an electromagnetic converter controlled by the signal issuing from the divider, time display means driven by said converter and a DC voltage supply source, said divider including a series of elementary dividing stages of which at least some each comprise, firstly, an elementary amplifier formed by an insulated-gate field-effect transistor and by a capacitor in series with the transistor, said amplifier being supplied with a periodic voltage that provides the signal to be divided by the dividing stage under consideration and being controlled by a voltage source constituted by the input capacitance of said transistor, and secondly, a circuit for charging said capacitance and a circuit for periodically discharging said input capacitance, which is controlled by the output signal of said elementary amplifier, and said periodic voltage for supplying each intermediate dividing stage is taken from the point of connection of a pair of insulated-gate field-effect transistors that are connected in series with said source of DC supply voltage, the control voltage for one of said transistors being provided by the output signal of the amplifier and for the other of said transistors being provided by a periodic voltage having a frequency at least equal to that of said output signal but phase-shifted in relation thereto.

In U.S. Pat. Spec. No. 3,383,570 there is described an electronic timepiece which partly corresponds to that set forth above, in particular as regards the portion thereof which is intended to divide medium frequency signals and which is made up of a series of dividing stages, referred to as being of the "B" type in the above patent specification, in which the input capacitance of the transistor of the respective amplifiers, that provides the memory of the stage, is charged by the signal which is to be divided by this stage.

In this kind of circuit, the time for charging and discharging the memory-acting capacitance is directly dependent on the characteristics of the transistors used, in particular on their threshold voltage and on their slope. But because this charging time is relatively long the use of B-type circuits is limited to the division of medium frequency signals.

However, because of the particularly simple structure of these circuits, which greatly facilitates the manufacture thereof in integrated form, applicant has sought to use this same type of circuit to divide signals of particularly high frequency.

According to the invention, there is provided an electronic timepiece of the kind set forth which further comprises a two-phase voltage generator controlled by the time standard and adapted to produce a two-phase signal having a frequency equal to the frequency of the signal delivered by the time standard or to a multiple or submultiple of said frequency, and a two-phase network supplied by said generator, and wherein the second transistor of each of said pairs of transistors is connected, by its gate, to one or other phase of said two-phase network, in alternation from one stage to the next, and the gate of the transistor belonging to the elementary amplifier of each intermediate dividing stage is connected to the connecting point between the pair of transistors that control the supply of the amplifier of the next stage, said pair of transistors thus forming said charging circuit for the input capacitance of the transistor belonging to the amplifier of the dividing stage under consideration.

The accompanying drawings illustrate, by way of example and very diagrammatically, one form of embodiment of the electronic timepiece provided by the present invention:

Figure 1:
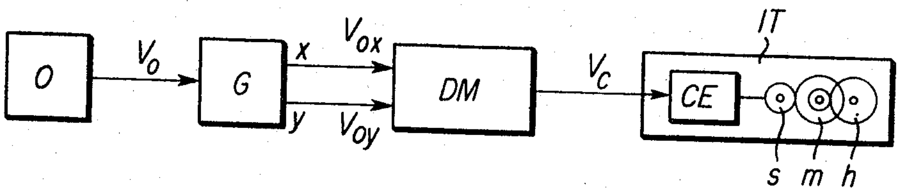
FIG. 1 is a block diagram thereof.

As shown in FIG. 1, the illustrated timepiece comprises a quartz oscillator O which delivers a periodic signal $V_0$ having a high frequency, say 2.4 m.c.p.s. to a generator G which serves to transform this signal into another, two-phase signal $V_{ox}$–$V_{oy}$ of the same frequency, or, by way of variant, having a frequency corresponding to a multiple or to a submultiple of the oscillator frequency. This two-phase signal $V_{ox}$–$V_{oy}$ is fed by a network X–Y to a divider DM which consists of a series of dividing stages whose supply is alternately controlled by one and then the other of the X and Y phases of this network, as will be described further on, and which serves to lower the frequency of the two-phase signal $V_{ox}$–$V_{oy}$ issuing from the generator G to a value of 1 c.p.s. (low-frequency signal $V_c$).

This signal $V_c$ serves to control a time-indicating device IT comprising an electromechanical converter CE and a gear train having three movable parts *s*, *m* and *h*, which are subjected to the action of the converter and which respectively drive the seconds, minutes and hour hands (not shown) of the timepiece.

Figure 2:
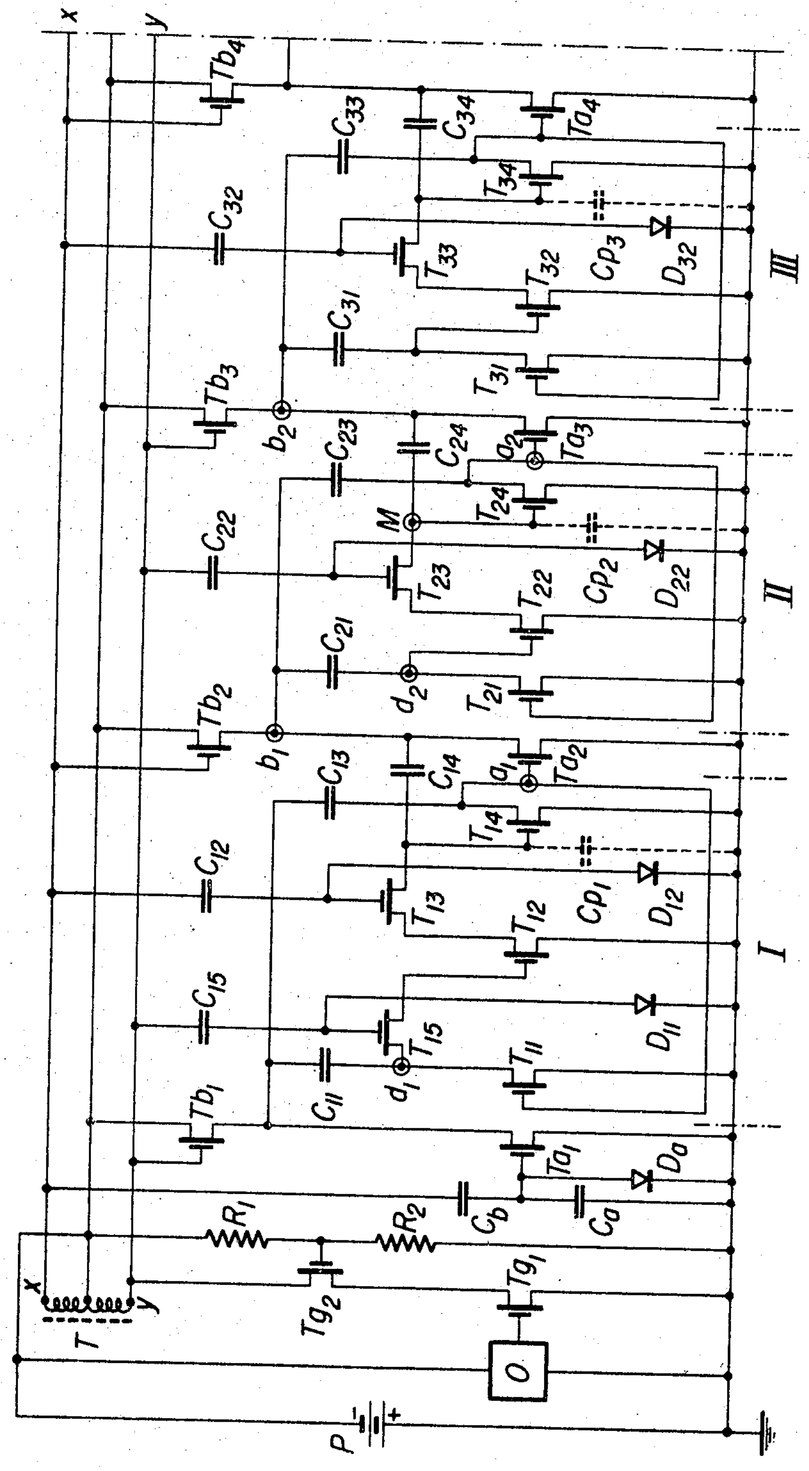
FIG. 2 is a partial representation of its electronic circuitry.

FIG. 2 illustrates the features of the generator G, of the first three stages of the divider D and of the supply means of each of these stages whereas the oscillator O is only illustrated by a rectangle. Suffice it to say that this oscillator is here required to produce a periodic signal of particularly stable frequency with a very low power consumption.

The generator G consists of a cascade amplifier comprising two series-connected insulated-gate field-effect transistors $Tg_1$ and $Tg_2$, a transformer T, e.g., a ferrite core transformer, and a voltage divider having resistors $R_1$ and $R_2$ connected in series with a voltage source P. The voltage divider serves to control transistor $Tg_2$ whereas transistor $Tg_1$ is controlled by the periodic signal delivered by the oscillator O. The winding of transformer T is connected at its middle point to the negative terminal of source P, its ends being each connected to one of the two phases of the X–Y network.

Figure 3:
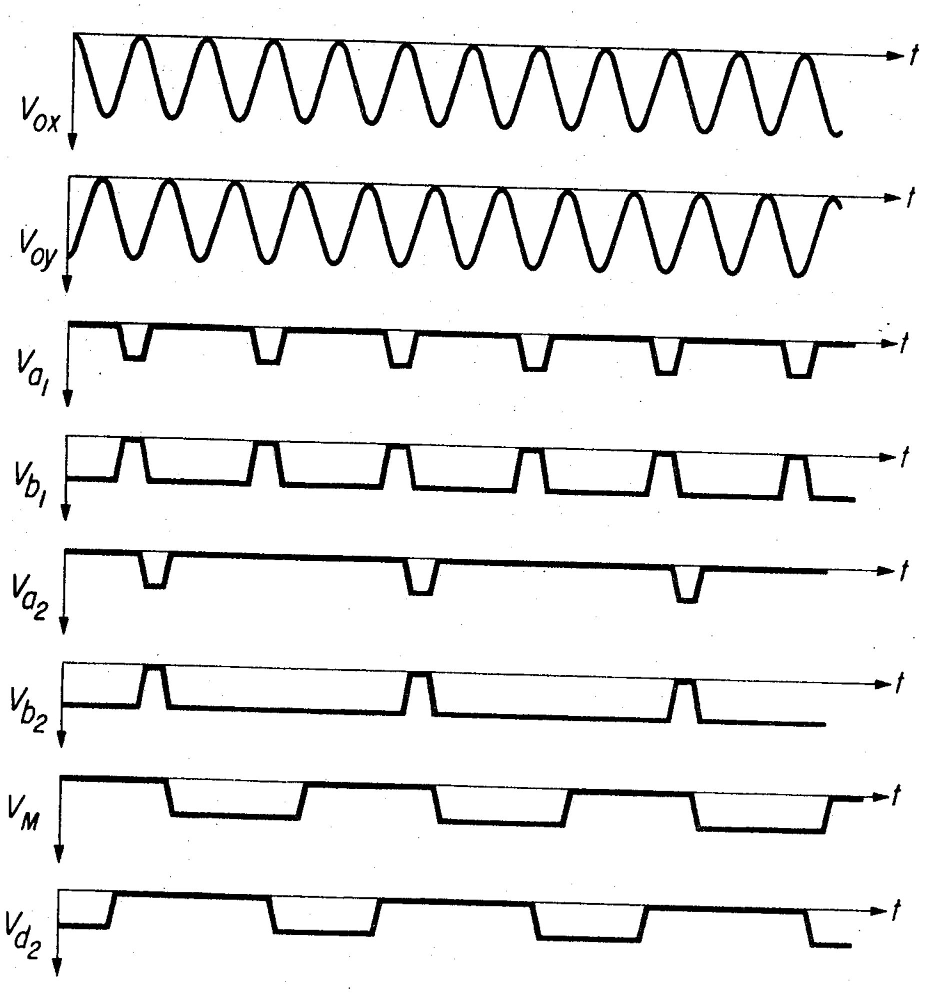
FIG. 3 is an explanatory diagram.

As is known, an amplifier of this kind produces at each end of the winding of transformer T an AC, sinusoidal, voltage $V_{ox}$ or $V_{oy}$, having a phase difference of , 180° from end to end (FIG. 3), so that the X–Y network effectively constitutes a two-phase voltage network.

Whatever may be the construction of the amplifier that is used, the latter can be so sized that the frequency of the two-phase voltage which is generated may be equal either to the frequency of the periodic signal delivered by the oscillator O, or to a submultiple or a multiple of this frequency, the above choice being essentially dependent on the kind of oscillator used, i.e., whether it is of very high frequency, of medium frequency or of low frequency, and on the size that is required for the oscillator and for the transformer.

As described, the electronic divider with which the timepiece according to the invention is provided is made up of a series of dividing stages of which the first three, I, II and III, can be seen in FIG. 2 and whose supply voltage is taken, in each case, from the point of connection between two insulated-gate field-effect transistors that are series connected between the terminals of source P and which are controlled in a manner described below.

In particular, stage I is supplied from the connecting point of two transistors $Ta_1$ and $Tb_1$, the gate of the first being connected to the intermediate point of a capacitive voltage divider comprising capacitors Ca and Cb series connected between the positive terminal of source P and the X phase of the two-phase X–Y network, and the gate of the second, $Tb_1$, being connected to the other, Y, phase of this network. Da is a clamping diode serving to define the potential applied to the gate of transistor $Ta_1$.

Stage II is supplied from the connecting point between two transistors $Ta_2$ and $Tb_2$, the gate of the first being connected to the output of the preceding dividing stage (I) and the gate of the second ($Tb_2$) being connected to the X phase of the two-phase network.

Stage III is supplied from the connecting point between two transistors $Ta_3$ and $Tb_3$, the gate of the first being connected to the output of stage II and the gate of the second ($Tb_3$) being connected to the Y phase of the two-phase network.

As a general rule, each stage starting from the second of the electronic divider provided in the timepiece according to the invention is supplied by the source P through the intermediary of a pair of insulated-gate field-effect transistors $Ta_n$ and $Tb_n$, the gate of the first ($Ta_n$) being controlled by the periodic signal issuing from the preceding dividing stage ($n$–1) and the gate of the second transistor ($Tb_n$) being connected to one or the other of the X and Y phases of the two-phase X–Y network, in alternation from one stage to the next.

The structure of the first stage (I) of the divider is slightly different from that of the following stages. It has two elementary amplifiers each comprising an insulated-gate field-effect transistor, $T_{11}$ and $T_{14}$ respectively, and a capacitor, $C_{11}$ and $C_{13}$ respectively, series connected with the transistor, which two amplifiers are supplied in parallel with a periodic signal taken from an intermediate point of the circuit located between the two transistors $Ta_1$ and $Tb_1$.

The elementary amplifier consisting of the transistor $T_{14}$ and of the capacitor $C_{13}$ is controlled by a voltage source provided by the input capacitance of transistor $T_{14}$, indicated in broken lines and identified by reference $Cp_1$, which capacitance is charged from a point located between transistors $Ta_2$ and $Tb_2$ and through a capacitor $C_{14}$, and is periodically discharged by a circuit that comprises two insulated-gate field-effect transistors $T_{12}$ and $T_{13}$. The transistor $T_{12}$ is controlled by the output signal of the amplifier formed by transistor $T_{11}$ and capacitor $C_{11}$, through a transistor $T_{15}$ whose gate is connected to the Y phase of the X–y network via a capacitor $C_{15}$. Transistor $T_{13}$ is connected, by its gate, to the X phase of the X–Y network via a capacitor $C_{12}$.

The elementary amplifier formed by transistor $T_{11}$ and by $C_{C11}$ is controlled by the output signal of the elementary amplifier formed by transistor $T_{14}$ and capacitor $C_{13}$. This same output signal is also used to control transistor $Ta_2$.

Clamping diodes $D_{a\ 11}$ and $D_{12}$ determine the potential of the gates of transistors $T_{15}$ and $T_{13}$, respectively.

The subsequent dividing stages are of identical structure. Each comprises two elementary amplifiers of the previously mentioned kind, which for instance, in the case of stage II, are formed by a transistor $T_{24}$ or $T_{21}$, respectively, and by a capacitor $C_{23}$ or $C_{21}$ respectively, arranged in series and supplied with a signal taken from the point of connection between transistors $Ta_2$ and $Tb_2$.

The control voltage source for amplifier $T_{24}$–$T_{23}$ is formed by the input capacitance $Cp_2$ of transistor $T_{24}$, which capacitance is charged through a capacitor $C_{24}$ from the point of connection between the transistors $Ta_3$ and $Tb_3$ for controlling the supply of the next stage (III).

Capacitance $Cp_2$ is periodically discharged by means of a circuit comprising two insulated-gate field-effect transistors $T_{22}$ and $T_{23}$ of which the first is controlled by the output signal of amplifier $T_{21}$–$C_{21}$ and the second is controlled by the Y phase of the X–Y network via a capacitor $C_{22}$. The potential at the gate of transistor $T_{23}$ is determined by a diode $D_{22}$.

The elementary amplifier $T_{21}$–$C_{21}$ is controlled by the output signal of amplifier $T_{24}$–$C_{23}$, i.e., by the output signal of stage III. This same signal is used to control transistor $Ta_3$.

As described, transistors $Tb_1$, $Tb_2$, $Tb_3$, $Tb_4$, . . . etc., which help to control the supply of dividing stages I, II, III, IV, etc., are connected by their gate to one or the other phase of the two-phase X–Y network, in alternation from one stage to the next.

Similarly, transistors $T_{13}$, $T_{23}$, $T_{33}$, . . . etc., which belong to the circuits for discharging capacitances $Cp_1$, $Cp_2$, $Cp_3$, . . . , etc. of stages I, II, III, . . . , etc., are connected by their gate to one or the other phase of the two-phase X–Y network, in alternation from one stage to the next.

As a general rule, the X or Y phase by which the transistor $Tn_3$ of stage $n$ is controlled is the same as that associated with the gate of transistor $Tb_{n+1}$.

All of the stages of the described divider, except the first, operate in the same manner and the operation of the second stage will now be given by way of example. To this end, an analysis will be made of the evolution of the potential at points $a_1$, $b_1$, $d_2$, M, $a_2$ and $b_2$ of the circuit illustrated in FIG. 2 with reference to FIG. 3.

Let it first of all be assumed that the gate of transistor $Ta_2$ receives from Stage I periodic pulses (signal $Va_1$ in FIG. 3) that are in phase with the alternating signal $V_{oy}$ of the Y phase of the two-phase network whereby transistor $Ta_2$ is periodically opened at the frequency of signal $Va_1$. Let it furthermore be assumed that, at the start, the input capacitance $Cp_2$ of transistor $T_{24}$ is discharged (signal $V_M$=0) so that this transistor is blocked.

When the first pulse of signal $Va_1$ reaches transistor $Ta_2$, the capacitance formed by the dividing stage II is discharged through this transistor so that the potential $Vb_1$ at point $b_1$ of this stage becomes zero.

Since transistor $Tb_2$ is controlled by signal $V_{ox}$, which is phaseshifted by 180° in relation to the signal $V_{oy}$, this transistor opens so that the capacitance of dividing Stage II is recharged (signal $Vb_1$) while transistor $T_{24}$ is still blocked. This causes a potential $Va_2$ to appear at the gate of transistor $Ta_3$ whereas transistor $Tb_3$ is blocked since it is controlled by the Y phase of the two-phase network: the capacitance of Stage II is thus discharged through transistor $Ta_3$ (see signal $Vb_2$ in FIG. 3).

During the subsequent half-period of the alternating signal $V_{oy}$, the capacitance of dividing Stage III is recharged since transistor $Ta_3$ is blocked, as will now be described.

Because the capacitance of stage II became discharged when the first pulse of signal $Va_1$ reached transistor $Ta_2$, the potential at point $d_2$ of this stage is zero and transistor $T_{23}$ is blocked. It follows therefore that, at the instant when the capacitance of Stage III begins to be recharged, the input capacitance $Cp_2$ of transistor $T_{24}$ also becomes recharged, via capacitor $C_{24}$ (potential $V_M$ in FIG. 3), despite the fact that the transistor $T_{23}$ alternately opens and closes at the frequency of signal $V_{oy}$.

When the control voltage of transistor $T_{24}$ reaches the threshold voltage level of the latter, the transistor opens thereby causing the input capacitances of transistors $Ta_3$ and $T_{21}$ to become discharged and causing these transistor to become blocked (formation of the first pulse of signal $Va_2$).

The input capacitance $Cp_2$ of transistor $T_{24}$ acts as a memory for Stage II as it is always charged when transistor $Ta_2$ receives the next pulse of the signal $Va_1$ emanating from Stage I, i.e., when the capacitance of stage II is being discharged then to become recharged to form a new pulse of signal $Vb_1$.

Because capacitance $Cp_2$ is charged transistor $T_{24}$ is open and point $a_2$ thus remains at potential zero (suppression of a pulse of signal $Va_1$). It follows therefore that transistor $T_{21}$ remains blocked and that potential $Vd_2$ at point $d_2$ of the circuit rises sufficiently to cause transistor $T_{22}$ to open, whereas transistor $T_{23}$ is blocked since the leading edge of signal $Vd_2$ is in phase with the alternating voltage $V_{ox}$ whereas transistor $T_{23}$ is controlled by the alternating voltage $V_{oy}$, which is phase-shifted by 180° in relation to the first. When transistor $T_{23}$, capacitance $Cp_2$ discharges through this transistor and through transistor $T_{22}$ which is always open.

Stage II is now in the same state as when the first pulse of signal $Va_1$ arrived so that the third pulse of this signal will cause a pulse of signal $Va_2$ to form whereas this will not be the case for the fourth pulse of $Va_1$, etc.

This kind of dividing stage cannot however be used as the first stage of the divider since the frequency of the signal appearing at its point $b_1$ would be equal to that of the voltage controlling the transistor $T_{23}$ : if transistor $T_{23}$ were open the potential at point $d_2$ would become zero and the memory-acting capacitance $Cp_2$ could not be recharged with the result that the dividing stage could supply no pulse at its output.

To overcome this drawback, the structure of the first dividing stage has been slightly modified by inserting a transistor $T_{15}$ in the control circuit of the insulated gate of transistor $T_{12}$, transistor $T_{15}$ being controlled off the same Y phase of the X–Y network to which is connected the gate of transistor $Tb_1$ but through a capacitor $C_{15}$.

It follows therefore that when a voltage pulse appears at point $d_1$ of stage I, the input capacitance of transistor $T_{12}$ becomes charged via transistor $T_{15}$. Since this capacitance remains charged, the memory-acting capacitance $Cp_1$ of transistor $T_{14}$ will become discharged when transistor $T_{13}$ is opened by the voltage $V_{0x}$ of phase X. The input capacitance of transistor $T_{12}$ will be discharged via transistors $T_{15}$ and $T_{11}$ by the following pulse of the output signal $Va_1$ of this stage I.

As is apparent from the above description, the charging of the memory-acting capacitance Cp of each dividing stage and its discharge are made to take place in a "forced" manner, so that their duration is no longer directly dependent on the characteristics of the transistors that are used, in particular on their threshold voltage and on their respective slope, as was the case with the B-type dividing stages described in U.S. Pat. Spec. No. 3,383,570..

This provides considerable latitude as regards the size of the transistors used in Stages I, II, III, etc.

Moreover, the dissipated power, which is already very much reduced by virtue of the operational principle of the described circuit, can be decreased still further by so choosing the inductivity of transformer T as to form a tuned circuit with the capacitance of the supply system of the various dividing stages, which capacitance is made up of the control capacitances of transistors $Tb_1$, $Tb_2$, $Tb_3$, $Tb_4$, . . . , $T_{15}$, $T_{13}$, $T_{23}$, $T_{33}$, . . . , of the capacitance of the voltage divider $C_a$–$C_b$, and of that of all connections with the X and Y phases of the two-phase network. The energy that is periodically stored in the capacitance provided by the supply system is thus to a large extent recovered so that the power consumption in the succession of stages comprised by the described divider is very low.

It should moreover be pointed out that the described divider is particularly well suited to be made in integrated circuit form since it is made up exclusively of Mos transistors of one conductivity type and of Mos capacitors.

I claim:

1. An electronic timepiece comprising a time standard delivering a periodic signal of predetermined frequency, an electronic divider for dividing said frequency, an electromagnetic converter controlled by the signal issuing from the divider, time display means driven by said converter and a DC voltage supply source, said divider including a series of elementary dividing stages of which at least some each comprise, firstly, an elementary amplifier formed by an insulated-gate field-effect transistor and by a capacitor in series with the transistor, said amplifier being supplied with a periodic voltage that provides the signal to be divided by the dividing stage under consideration and being controlled by a voltage source constituted by the input capacitance of said transistor, and secondly, a circuit for charging said capacitance and a circuit for periodically discharging said input capacitance, which is controlled by the output signal of said elementary amplifier and said periodic voltage for supplying each intermediate dividing stage is taken from the point of connection of a pair of insulated-gate field-effect transistors that are connected in series with said source of DC supply voltage, the control voltage for one of said transistors being provided by the output signal of the amplifier and for the other of said transistors being provided by a periodic voltage having a frequency at least equal to that of said output signal but phase-shifted in relation thereto, said timepiece further comprising a two-phase voltage generator controlled by the time standard and adapted to produce a two-phase signal having a frequency equal to the frequency of the signal delivered by the time standard or to a multiple or submultiple of said frequency, and a two-phase network supplied by said generator, and wherein the second transistor of each of said pairs of transistors is connected, by its gate, to one or other phase of said two-phase network, in alternation from one stage to the next, and the gate of the transistor belonging to the elementary amplifier of each intermediate dividing stage is connected to the connecting point between the pair of transistors that control the supply of the amplifier of the next stage, said pair of transistors thus forming said charging circuit for the input capacitance of the transistor belonging to the amplifier of the dividing stage under consideration.

2. An electronic timepiece according to claim 1, wherein the circuit for controlling the periodic discharge of the input capacitance of the transistor of the elementary amplifier of each intermediate dividing stage comprises, firstly, a second elementary amplifier consisting of an insulated-gate field-effect transistor and of a capacitor in series with the transistor, said amplifier being supplied with the signal to be divided by the dividing stage under consideration and being controlled by the output signal of this stage, and secondly, at least two insulated-gate field-effect transistors, in series, between the gate of the transistor of the first amplifier and earth, the first of said two transistors being controlled by the output signal of the second amplifier and the second transistor being controlled by a signal having a frequency at least equal to that of the signal to be divided by the dividing stage, and wherein said second transistor is controlled by the phase of the two-phase network to which is connected the second transistor of the pair of transistors that control the supply of the next dividing stage.

3. An electronic timepiece according to claim 2, wherein said generator comprises a transformer to which is connected said network, and wherein the inductivity of the transformer and the charging capacitance of the generator are so chosen as to form a tuned circuit on the frequency of the two-phase signal of the network.

* * * * *